United States Patent [19]  [11] 3,985,577
Russell  [45] Oct. 12, 1976

[54] LITHIUM/FLUOROGRAPHITE PRIMARY CELL WITH IMPROVED ELECTROLYTE

[75] Inventor: Jerry L. Russell, Joplin, Mo.

[73] Assignee: Eagle-Picher Industries, Inc., Cincinnati, Ohio

[22] Filed: Sept. 12, 1974

[21] Appl. No.: 505,474

Related U.S. Application Data

[63] Continuation of Ser. No. 285,529, Aug. 31, 1972, abandoned.

[52] U.S. Cl. ............................ 429/194; 429/213
[51] Int. Cl.$^2$ ............................... H01M 17/02
[58] Field of Search ............ 136/83 R, 100 R, 6 LN, 136/154, 20, 121, 137

[56] References Cited
UNITED STATES PATENTS

| 3,415,687 | 12/1968 | Methlie | 136/100 R |
| 3,514,337 | 5/1970 | Braeuer et al. | 136/100 R |
| 3,536,532 | 10/1970 | Watanabe et al. | 136/83 R |
| 3,579,384 | 5/1971 | Abens | 136/100 R |
| 3,681,144 | 8/1972 | Dey et al. | 136/83 R |

Primary Examiner—Anthony Skapars
Attorney, Agent, or Firm—Wood, Herron & Evans

[57] ABSTRACT

A primary cell having a lithium anode, a fluorographite cathode, and an electrolyte of dimethyl sulfite containing dissolved lithium hexafluoroarsenate demonstrates discharge characteristics in excess of theoretical. For low temperature operation, an electrolyte employing a mixture of dimethyl sulfite and methyl formate solvents gives results superior to either solvent used independently.

8 Claims, 5 Drawing Figures

LITHIUM/FLUOROGRAPHITE PRIMARY CELL WITH IMPROVED ELECTROLYTE

This application is a continuation of Ser. No. 285,529 filed Aug. 31, 1972, now abandoned.

This invention relates to improvements in primary cells of the type having a lithium anode and a fluorographite cathode, and more specifically pertains to electrolytes which give synergistic results when used in such cells.

Primary or nonrechargeable cells based on the lithium/fluorographite couple are known in the art, being disclosed in Braeuer et al. U.S. Pat. No. 3,514,337, and in Watanabe et al. U.S. Pat. No. 3,536,532. Such cells display high energy density (watt-hours/pound), which is important for applications where battery weight and volume are limited, for example, in space exploration.

In such cells, the anode comprises metallic lithium. The cathode includes as the active material a graphite-fluorine intercalation compound of the general formula $(CF_x)_n$ wherein $x$ is a fraction or a small number, and $n$ is a very large or virtually infinite number and represents the number of recurring $CF_x$ groups in the compound. This compound, known as fluorographite, can be prepared by reacting powdered graphite with a mixture of fluorine and hydrogen fluoride at room temperature. According to another technique, graphite powder is reacted with fluorine at about 850° F. for several hours. According to the contacting technique and the conditions used, it is possible to obtain fluorographite compounds with different $x$ values (i.e., different fluorine/carbon ratios) from about 0.13 to 1.5 or more. The material is available commercially from Ozark-Mahoning Co., Tulsa, Oklahoma. In the practice of this invention, value of $x$ should be at least about 0.5, and preferably should be about 1.0.

In a typical cell based on the lithium/fluorographite couple, the fluorographite is combined with a highly conductive material such as carbon black or acetylene black, and a binder, and is pasted on a supporting grid. The anode and the cathode, on opposite sides of a separator plate between them, are immersed in an electrolyte.

Fluorographite is generally believed to have one of the highest theoretical capacities of any cathode material. Its theoretical capacity is about 51.9 ampere-minutes per gram, this value being obtained as the result of dividing 96,500 coulombs by the equivalent weight of $CF_x$ (which is 31 where $x$ is 1.0), and dividing again by 60 to convert to minutes. This corresponds to 864 ampere hours per kilogram. Since the materials are light, the energy density is very high.

It has generally been believed that ampere-minute yields, per gram of active material of about 52 were the highest that could be obtained by use of fluorographite cathode material, since that value is its approximate theoretical capacity. I have discovered, however, that by use of a critical electrolyte, this theoretical capacity value can actually be substantially exceeded in practice. In the practice of this invention, outputs which are twice the theoretical value can be obtained under some circumstances, and capacities of 20 to 30 percent above the theoretical value are readily obtained. It is believed that this surprising result is obtained because the electrolyte takes part in the discharge reaction, and in effect establishes a higher capacity, the explanation or calculation of which is not presently known.

Specifically, the electrolyte which makes these results possible is a system which includes a specific solvent and a specific solute. The requisite solvent is the organic liquid dimethyl sulfite, which is commonly represented by the formula $(CH_3)_2SO_3$. The solute dissolved in the solvent is lithium hexafluoroarsenate, which can be represented as $LiAsF_6$. This electrolyte, when used in conjunction with the $Li/CF_x$ couple, provides an exceedingly high capacity that is in excess of the theoretical capacity of usual $CF_x$ cathodes.

In the manufacture of a $Li/CF_x$ cell utilizing the new electrolyte, the formation of the anode and cathode may be conventional and does not comprise the invention. The anode and cathode should be completely immersed in and wetted by the electrolyte. With respect to the relative proportion of solute to solvent, optimum performance results when the dimethyl sulfite is saturated with lithium hexafluoroarsenate. This is believed to occur at approximately 0.76 molar $LiAsF_6$, at 23° C. With respect to the relative proportion of fluorographite to electrolyte, optimum performance is achieved where an excess of electrolyte is present. However, where weight or volume is limited, excellent performance can still be obtained with lesser amounts of electrolyte in relation to the fluorographite. For example, the ratio of electrolyte to fluorographite (where the $x$ value is 1) in a typical cell can very usefully be in the range of about 2 to 3 cc of electrolyte per gram of fluorographite. Even under this condition, cathode yields of about 68 ampere-minutes per gram of CF are obtained.

The electrolyte solvent specified may be admixed with other solvents while retaining at least some of the benefits of its use. The addition of methyl formate in particular has been found greatly to improve the low temperature (below about 0° F.) operation of the cell.

The advantages of the invention can best be further explained by reference to the accompanying drawings wherein.

EXAMPLE I

A cell was constructed having a lithium anode, and fluorographite with an $x$ value of 1.0 as the active cathode material. The fluorinated graphite used was a commercially available material purchased from Ozark-Mahoning Co., made by heating graphite with fluorine in the presence of a catalyst. This material was mixed with carbon black and a binder in a weight ratio of about 85% active cathode material, 10% black, and 5% binder, and was pasted on a gridwork of copper to support it. The size of the molded electrode was 3.3 square inches. An excess of lithium metal was present. The electrolyte used was a solution of lithium hexafluoroarsenate dissolved in dimethyl sulfite at a concentration of 15 gms. $LiAsF_6$ per 100 cc of the sulfite (0.76 mol). As a separator, a sheet of hemp fiber paper was used. The anode and cathode were completely immersed in an excess of electrolyte, that is, the cell elements were immersed in sufficient electrolyte that they were not allowed to go dry. These elements were placed in a polyethylene case and sealed to form a battery. The assembly was effected in an inert atmosphere of argon.

The cell was tested at 75° F., under load conditions establishing a current density of approximately one milliampere per square centimeter. This battery demonstrated an ampere-minute yield, per gram of cathode mix, of 103. Converted to a basis of active cathode material (the cathode weight being only 85% fluorographite), the ampere-minute yield per gram was 122—more than twice the theoretical value of 51.9. This very substantially exceeds the values of 48 – 51.6 expressed in the prior art for previously known $CF_x$ cells. The cathode efficiency, expressed as 100% × actual capacity/theoretical capacity, is better than 200%. The cell developed an average voltage of 2.1 at a current density of one milliampere per square centimeter. The energy density of this cell, in watt hours per pound, was 230, excluding the weight of the cell case.

Figure 1:
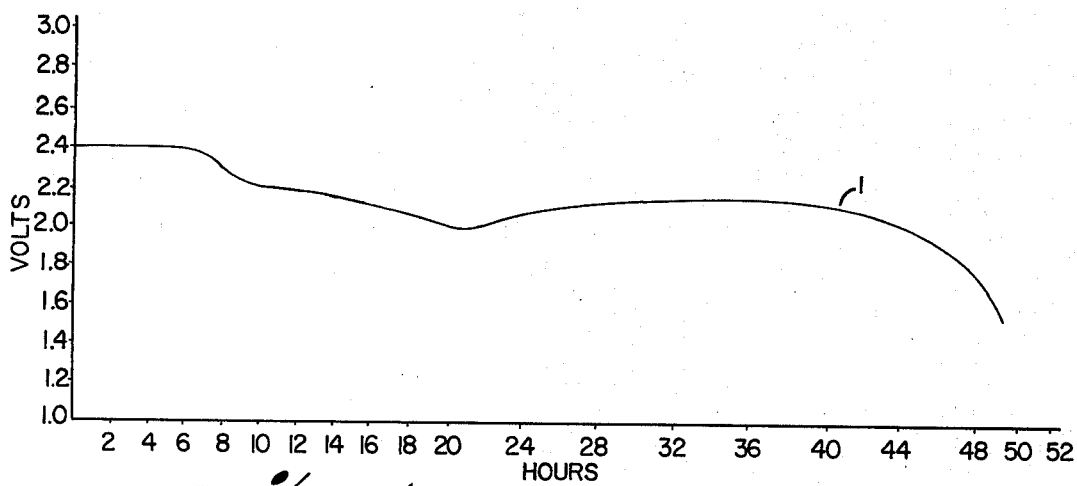
FIG. 1 is a diagram showing the discharge voltage, as a function of time, of a cell in accordance with one embodiment of the invention.

The discharge curve of the battery so formed, when discharged at 43 ma, is designated as 1 in FIG. 1.

It is a pecularity of this system, in contrast to prior art cells, that the electrolyte is consumed during discharge. This consumption of electrolyte is believed to underlie the very high output achieved. In fact, a cell may go dry after prolonged use, and the electrolyte volume for a given use should be adjusted accordingly. This can be determined by simple tests at discharge rates corresponding to those under the expected usage.

EXAMPLE 2

Figure 2:
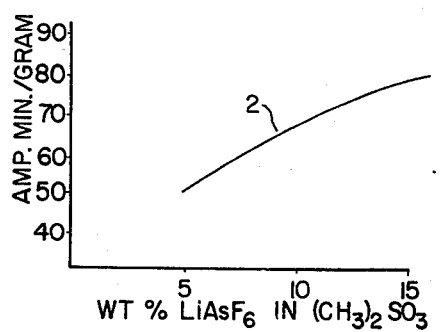
FIG. 2 is a diagram showing the variation of cathode yield with different solute/solvent ratios.

Other test cells were constructed similar to the cell of Example 1, but having different levels of lithium hexafluoroarsenate concentration in the dimethyl sulfite solvent. The anode and cathode of each cell were completely immersed in an excess of electrolyte. The cells were tested at 75° F., under load conditions approximating a current density of two milliamperes per square centimeter. The curve at 2 in FIG. 2 illustrates the results of these tests. The concentration levels were terminated at 15% (.76 molar) where the solution approaches saturation for the particular brand of lithium hexafluoroarsenate employed.

EXAMPLES 3–5

Figure 3:
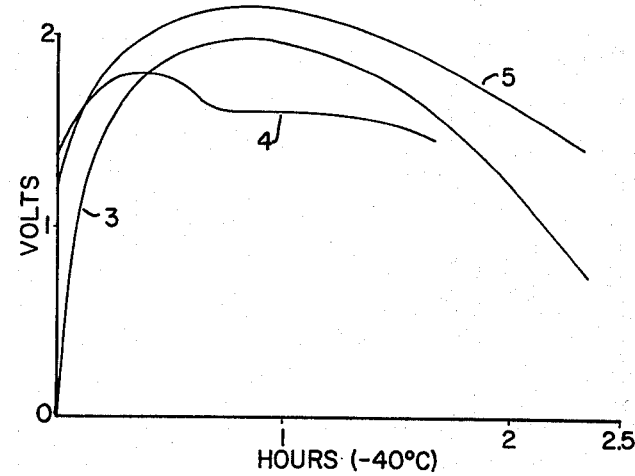
FIG. 3 is a diagram showing the low temperature discharge voltage, as a function of time, of three cells with different solvents.

For low temperature operation, electrolytes employing a mixture of dimethyl sulfite and methyl formate solvents give results far superior to either solvent used independently. Three structurally comparable cells were discharged at −40° C. with resistive loads of 1.6 ohms. Each cell contained 4.5 grams of monofluorographite as the active cathode material, an excess of lithium as the anode, an active surface area of 210 square centimeters and 10 cc of the electrolyte under test. One cell, designated as 3, employed a solvent of only dimethyl sulfite with a solute of 0.76 molar lithium hexafluoroarsenate. This cell produced a cathode yield of 20 ampere-minutes per gram of monofluorographite above a cell potential of 1.70 volts. This represents a cathode efficiency of 38%. Its discharge curve is labeled 3 in FIG. 3. A cell designated as 4 employed a solvent of only methyl formate and a solute of 2.5 molar lithium hexafluoroarsenate. This test resulted in a cathode yield of 18 ampere-minutes per gram of monofluorographite above a cell potential of 1.70 volts. This represents a cathodic efficiency of 34.5%. (Note that this cell had a much greater $LiAsF_6$ content than cell 3 by reason of the greater solubility of that material in methyl formate than in dimethyl sulfite). A cell designated as 5 employed a solvent of 50% methyl formate and 50% dimethyl sulfite by volume with a solute of 1.25 molar lithium hexafluoroarsenate. This test resulted in a cathode yield of 31 ampere-minutes per gram of monofluorographite above a cell potential efficiency of 60%. Note that this higher efficiency was obtained at a lower $LiAsF_6$ content than cell 4 had. The low temperature discharge curves of cells 3, 4 and 5 are represented as the correspondingly designated curves in FIG. 3.

The volume proportion of methyl formate in the solvent is not critical, and may suitably be between about 25% and 75%, the remainder being dimethyl sulfite. An approximate 1:1 volume ratio is generally suitable.

An approximate 1.5 molar concentration of the lithium hexafluoroarsenate solute in the mixed dimethyl sulfite/methyl formate solvents gives especially useful results.

COMPARISON WITH PRIOR ART

Watanabe et al. U.S. Pat. No. 3,536,532 shows a $Li/CF_x$ cell, having an x value of 1, wherein propylene carbonate is suggested as the electrolyte solvent and lithium perchlorate ($LiClO_4$) is the solute. The results obtained on discharge of a cell made according to that patent are given as Test A in Table I, and its discharge curve is labeled A in FIG. 4. By comparison to the Examples given above, it is apparent that this cell did not produce results equivalent to those yielded by the cell of this invention.

Braeuer et al. U.S. Pat. No. 3,514,337 shows a lithium fluorographite cell wherein x has a value between about 0.13 and 0.29. As electrolyte solutes, the patent lists inorganic lithium salts such as lithium perchlorate and lithium bromide. As solvents, it lists organic solvents such as propylene carbonate, dimethyl carbonate, butyrolacetone, ethyl acetate, nitromethane, dimethyl formamide, and tetrohydrofuran. A cell was made according to that patent, utilizing dimethyl carbonate as the solvent and lithium perchlorate as the solute for the $Li/CF_x$ electrodes. The results obtained by discharging it are identified as Test B in Table I. The discharge curve is so labeled in FIG. 4.

Figure 4:
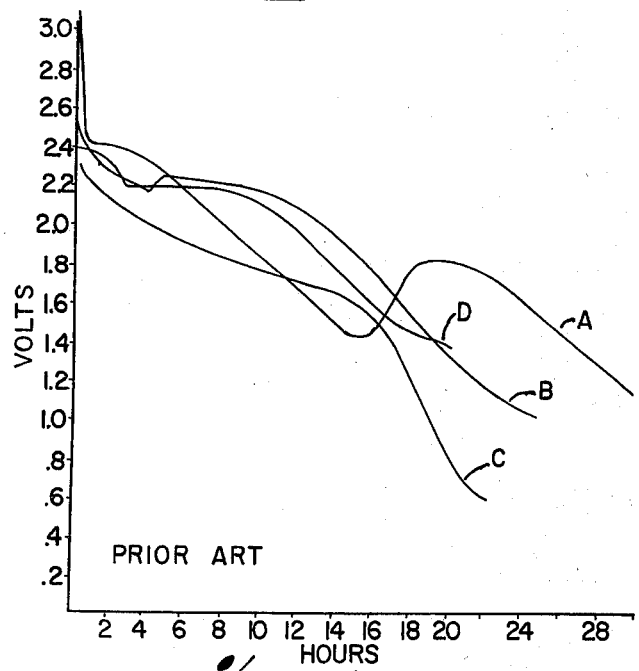
FIG. 4 is a diagram of the discharge curves of certain prior art cells.

Results obtained upon discharge of another cell made according to the Braeuer patent utilizing dimethyl formamide as the solvent are given in Table I as Test C and the discharge curve is so designated in FIG. 4.

The results obtained with another cell made according to the Braeuer patent but having propylene carbonate as the solvent and lithium bromide as the solute, are listed in Table I as Test D and its dischrge curve is correspondingly labeled D in FIG. 4.

In each of the above tests A-D of prior art batteries of the lithium/$CF_x$ type, the yields were well below the respective theoretical capacities, whereas the system of this invention produces yields well in excess of theoretical capacity. Moreover, in each case the prior art cell did not display any loss of electrolyte during discharge, whereas there was a distinct loss of electrolyte in the system of this invention, again indicating that a distinctly different type of electrolyte reaction occurs here.

The foregoing comparison test concerns systems of the lithium/$CF_x$ type. The results of the tests comparing the present invention with other cells having lithium anodes but different cathode materials are now described.

Figure 5:
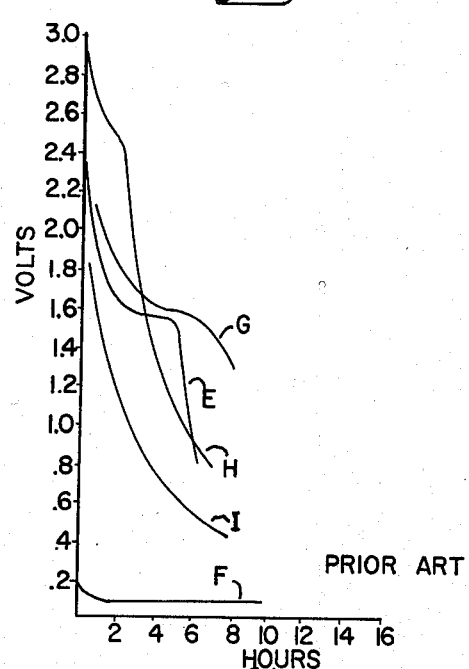
FIG. 5 is a diagram of the discharge curves of other prior art cells.

Shaw et al. U.S. Pat. No. 3,393,092 describes a cell of the lithium/cadmium fluoride type, utilizing dimethyl sulfite as the electrolyte solvent and, as the solute, a complex fluorite of the type $MPF_6$ wherein M represents a metal ion from groups I–VIII of the periodic table. The results obtained by discharge of a cell made according to this patent, utilizing dimethyl sulfite as the solvent and $LiPF_6$ as the solute are given in Test E in Table I. The discharge curve of the cell is labeled E in FIG. 5.

Methlie U.S. Pat. No. 3,415,687 discloses a cell having a lithium anode and a depolarizing cathode which may be a heavy metal compound. Methyl acetate is specified as the electrolyte solvent, and hexafluoroarsenates are listed as a possible electrolyte solute. The results obtained upon discharge of a cell utilizing lithium as the anode, silver (I) fluoride as the active cathode material, methyl acetate as the solvent, and $LiAsF_6$ as the solute are identified as Test F in Table I. The discharge curve is labeled F in FIG. 5.

U.S. Pat. No. 3,579,384 shows a cell having a lithium anode, a cathode of copper (II) fluoride, methyl formate as the electrolyte solvent, and lithium hexafluoroarsenate as the solute. Results obtained on discharge of a cell having the composition of this patent are identified in Table I as Test G, and the discharge curve is labeled G in FIG. 5.

Rao U.S. Pat. No. 3,413,154 shows a cell having a lithium anode and a cathode utilizing powdered sulfur as the active material, an electrolyte solvent of dimethyl sulfoxide and a solute of a light metal tetrafluoborate. The results obtained by discharge of a cell of this composition with a solute of lithium tetrafluoborate, $LiBF_4$, are given in the table as Test H and the discharge curve is so labeled in FIG. 5.

Byrne et al. U.S. Pat. No. 3,553,031 shows a cell having a lithium anode, an active cathode material which is trichloroisocyanuric acid, methyl formate as the electrolyte solvent, and lithium perchlorate as the preferred solute. Results obtained by discharge of this cell are given in Table I as Test I, and appear as curve I in FIG. 5.

It will be observed that, in each case, no prior art material gave an ampere-minute yield per gram of active cathode material that was nearly as high as that obtained by the preferred electrolyte of this invention. Moreover, in no case did the prior art material exceed its theoretical capacity, in contrast to the results obtained by the system of this invention. In no case was there evidence of electrolyte depletion in the prior art, in contrast to the present system. In no case did the cell energy density of prior art materials approach the values obtained by the present compositions. The reason for this superior performance of the dimethyl sulfite solvent is not known.

Having described the invention, what is claimed is:

1. A primary cell comprising,
   a lithium anode,
   a cathode having as the active component thereof a fluorographite of the type $(CF_x)_n$ where $x$ is greater than about 0.5 and $n$ is an indefinitely large number,
   and an electrolyte comprising a solvent and a solute, the said solvent consisting of an organic liquid which is a member of the class consisting of dimethyl sulfite and mixtures of dimethyl sulfite and methyl formate,
   the said solute consisting of lithium hexafluoroarsenate dissolved in said solvent,
   the said cell having a yield efficiency which is substantially in excess of 100%.

2. The primary cell of claim 1 wherein $x$ is about 1.0.

3. The primary cell of claim 1 wherein said solvent is dimethyl sulfite.

4. The primary cell of claim 3 wherein the solvent is saturated with solute.

5. The primary cell of claim 1 wherein said solvent is a mixture of dimethyl sulfite and methyl formate, and wherein the methyl formate content of said mixture is in the range of about 25 to 75% by volume.

6. The primary cell of claim 5 wherein the volume ratio of the two solvents to one another is about 1:1.

7. The primary cell of claim 5 wherein the solute concentration is about 1.5 molar.

8. The primary cell of claim 1 wherein the proportion of electrolyte to fluorographite is about 2 to 3 cc of electrolyte per gram of fluorographite.

TABLE I

| Test | Anode Mat. | Active Cathode Mat. | Electrolyte Solvent | Electrolyte Solute | Theoretical Capacity Per Gram | Ampere Minute Yield Per Gram of Cathode Mix | Ampere Minute Yield Per Gram of Active Cathode Material | Percent Efficiency Yield/Theoretical | Avg. Voltage at a Current Density of 1 Ma/Sq. Cm | Cell Energy Density in W-H/lb. Cell Case Wt. Excluded |
|---|---|---|---|---|---|---|---|---|---|---|
| A | Li | $CF_x$ x=1 | Propylene Carbonate | $LiClO_4$ | 51.9 | 44.5 | 52.6 | 101 | 1.8 | 85 |
| B | Li | $CF_x$ x=1 | Dimethyl Carbonate | $LiClO_4$ | 51.9 | 37.8 | 43.2 | 83 | 2.0 | 80 |
| C | Li | $CF_x$ x=1 | Dimethyl Formamide | $LiClO_4$ | 51.9 | 28.1 | 31.5 | 61 | 1.8 | 53 |
| D | Li | $CF_x$ x=1 | Propylene Carbonate | LiBr | 51.9 | 32.2 | 37.8 | 73 | 2.0 | 68 |
| E | Li | CdF | Dimethyl Sulfite | $LiPF_6$ | 12.2 | 4.42 | 6.6 | 54 | 1.7 | 12 |
| F | Li | AgF | Methyl Acetate | $LiAsF_6$ | 12.7 | — | — | — | 0.1 | — |
| G | Li | $CuF_2$ | Methyl Formate | $LiAsF_6$ | 28.9 | 3.7 | 12.9 | 45 | 1.6 | 18 |
| H | Li | S | Dimethyl Sulfoxide | $LiBF_4$ | 200 | 2.8 | 4.1 | 4.9 | 2.1 | 14 |
| I | Li | Trichloroisocyanuric Acid | Methyl Formate | $LiClO_4$ | 22 | 0.78 | 1.15 | 5.2 | 1.7 | 3 |